(12) United States Patent
Franklin et al.

(10) Patent No.: US 11,150,474 B2
(45) Date of Patent: Oct. 19, 2021

(54) ADJUSTABLE ELECTRONIC DEVICE SYSTEM WITH FACIAL MAPPING

(71) Applicant: Apple Inc., Cupertino, CA (US)

(72) Inventors: Jeremy C. Franklin, San Francisco, CA (US); Trevor J. Ness, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/021,942

(22) Filed: Sep. 15, 2020

(65) Prior Publication Data
US 2020/0409147 A1 Dec. 31, 2020

Related U.S. Application Data

(63) Continuation of application No. 16/269,336, filed on Feb. 6, 2019, now Pat. No. 10,838,203.
(Continued)

(51) Int. Cl.
G02B 27/01 (2006.01)
G02B 27/00 (2006.01)
G06K 9/00 (2006.01)

(52) U.S. Cl.
CPC ..... *G02B 27/0149* (2013.01); *G02B 27/0093* (2013.01); *G06K 9/00248* (2013.01);
(Continued)

(58) Field of Classification Search
CPC ........... G06K 9/00604; G06K 9/00248; G02B 2027/0169; G02B 2027/0154;
(Continued)

(56) References Cited

U.S. PATENT DOCUMENTS 5,187,503 A 2/1993 Hilton et al.
5,291,230 A * 3/1994 Bradley ................. G02C 5/122
351/128
(Continued)

FOREIGN PATENT DOCUMENTS

CN 205750114 U 11/2016
CN 106353888 A 1/2017
(Continued)

*Primary Examiner* — Mihir K Rayan
(74) *Attorney, Agent, or Firm* — Treyz Law Group, P.C.; G. Victor Treyz; Joseph F. Guihan

(57) ABSTRACT

A head-mounted device may have a display for displaying image content. Head-mounted support structures in the device may be used to support the display. The head-mounted device or external equipment may include a three-dimensional image sensor. The three-dimensional image sensor may capture a three-dimensional image of a user's face. Control circuitry may analyze the three-dimensional image to identify which of multiple versions of a customizing face-fit module should be used in the electronic device to fit the device to the user's face. An appropriate face-fit module may be identified based on facial features such as facial size and the shapes of a user's forehead, nose, and cheeks. After identifying which version of the face-fit module is to be used by the user, that version of the face-fit module may be coupled to a non-custom portion of a main unit for the head-mounted device using magnets or other coupling structures.

17 Claims, 5 Drawing Sheets

Related U.S. Application Data

(60) Provisional application No. 62/699,370, filed on Jul. 17, 2018.

(52) U.S. Cl.
CPC .............. *G02B 2027/0138* (2013.01); *G02B 2027/0154* (2013.01); *G02B 2027/0169* (2013.01)

(58) Field of Classification Search
CPC ........ G02B 2027/0138; G02B 27/0176; G02B 27/0149; G02B 27/0093
See application file for complete search history.

(56) References Cited

U.S. PATENT DOCUMENTS

| | | | |
|---|---|---|---|
| 5,486,841 A | 1/1996 | Hara et al. | |
| 5,539,422 A | 7/1996 | Heacock et al. | |
| 5,880,773 A | 3/1999 | Suzuki | |
| 6,095,650 A | 8/2000 | Gao et al. | |
| 6,480,174 B1* | 11/2002 | Kaufmann | G02B 27/0172 345/7 |
| 6,843,562 B1 | 1/2005 | Ng | |
| 7,959,287 B1 | 6/2011 | Saffra | |
| 8,733,936 B1 | 5/2014 | Kornilov et al. | |
| 8,959,781 B2 | 2/2015 | Delort | |
| 10,838,203 B2* | 11/2020 | Franklin | G02B 27/0093 |
| 2003/0063105 A1* | 4/2003 | Agnew | G06T 11/60 345/660 |
| 2008/0088529 A1 | 4/2008 | Tang | |
| 2011/0051074 A1* | 3/2011 | Arnell | G02C 9/04 351/47 |
| 2012/0263449 A1* | 10/2012 | Bond | G02C 11/10 396/420 |
| 2013/0088490 A1* | 4/2013 | Rasmussen | G06T 19/006 345/421 |
| 2013/0170031 A1 | 7/2013 | Bohn et al. | |
| 2013/0318776 A1 | 12/2013 | Jacobs et al. | |
| 2013/0322683 A1* | 12/2013 | Jacobs | G02C 13/003 382/103 |
| 2014/0104143 A1* | 4/2014 | Benson | G02B 27/017 345/8 |
| 2014/0104568 A1 | 4/2014 | Cuta et al. | |
| 2014/0171772 A1* | 6/2014 | Blomquist | A61B 5/7475 600/365 |
| 2014/0192085 A1* | 7/2014 | Kim | G02B 27/017 345/633 |
| 2015/0277155 A1 | 10/2015 | Raviv | |
| 2015/0359423 A1 | 12/2015 | Chuang et al. | |
| 2016/0034032 A1* | 2/2016 | Jeong | G02B 27/0179 345/156 |
| 2016/0171772 A1* | 6/2016 | Ryznar | G06F 3/0346 345/633 |
| 2016/0292918 A1 | 10/2016 | Cummings et al. | |
| 2016/0349521 A1 | 12/2016 | Zhao et al. | |
| 2017/0168306 A1 | 6/2017 | Dreyer et al. | |
| 2017/0237977 A1* | 8/2017 | Patel | H04N 13/371 348/53 |
| 2018/0096533 A1* | 4/2018 | Osman | G06T 15/60 |
| 2019/0028697 A1* | 1/2019 | Sullivan | G06Q 20/327 |
| 2021/0088811 A1* | 3/2021 | Varady | G02C 13/005 |

FOREIGN PATENT DOCUMENTS

| | | |
|---|---|---|
| CN | 107024770 A | 8/2017 |
| CN | 107491165 A | 12/2017 |
| CN | 206990931 U | 2/2018 |

* cited by examiner

ADJUSTABLE ELECTRONIC DEVICE SYSTEM WITH FACIAL MAPPING

This application is a continuation of non-provisional patent application Ser. No. 16/269,336, filed Feb. 6, 2019, which claims the benefit of provisional patent application No. 62/699,370, filed Jul. 17, 2018, which are hereby incorporated by reference herein in their entireties.

BACKGROUND

This relates generally to electronic devices and, more particularly, to wearable electronic device systems.

Electronic devices are sometimes configured to be worn by users. For example, head-mounted display devices are provided with head-mounted structures that allow the devices to be worn on users' heads.

It can be challenging to ensure that a head-mounted device fits a user's head satisfactorily. If care is not taken, a head-mounted device will not fit properly and will be uncomfortable to use.

SUMMARY

An electronic device such as a head-mounted device may have a display for displaying image content. Head-mounted support structures in the device may be used to support the display. The head-mounted support structures may include straps coupled to a main unit. The main unit may house the display. The display may be used to display content for a user while the user is wearing the head-mounted support structures. An additional display may be coupled to the head-mounted support structures. The additional display may be formed on external surfaces of the head-mounted support structures or other portion of the head-mounted device.

The head-mounted device or external equipment that communicates with the head-mounted device may include a three-dimensional image sensor. The three-dimensional image sensor may capture a three-dimensional image of a user's face.

Control circuitry may analyze the three-dimensional image to determine which of multiple versions of a customized face-fit module should be used in the head-mounted device to optimize the fit of the head-mounted device on the user's head. Information on the identified face-fit module may be displayed on one of the additional display and can be viewed by the user when the user is not wearing the head-mounted device. The customized face-fit module may be selected based on user facial feature characteristics in the three-dimensional image of the user's face such as facial size and the shapes of a user's forehead, nose, and cheeks.

After identifying which version of the face-fit module is to be used by the user, that version of the face-fit module may be coupled to a non-custom portion of a main unit for the head-mounted device using magnets or other coupling structures. The head-mounted device may then be used to display content for the user while the user is wearing the head-mounted device.

DETAILED DESCRIPTION

Electronic devices may include displays and other components for presenting content to users. The electronic devices may be wearable electronic devices. A wearable electronic device such as a head-mounted device may be worn on a user's head. Wearable devices may also be worn on other user body parts (e.g., a user's wrist, fingers, etc.). To enhance user comfort, portions of a wearable electronic device may be adjustable. For example, an electronic device may be customized for a user by selecting and attaching a custom interface structure to an electronic device or by adjusting components within the electronic device. Customization operations can be facilitated by gathering three-dimensional images of a user's head or other body part. For example, a three-dimensional image of a user's face may be captured to determine a user's interpupillary distance and the shapes of facial features such as the user's forehead, nose, cheeks, ears, etc.

Figure 1:
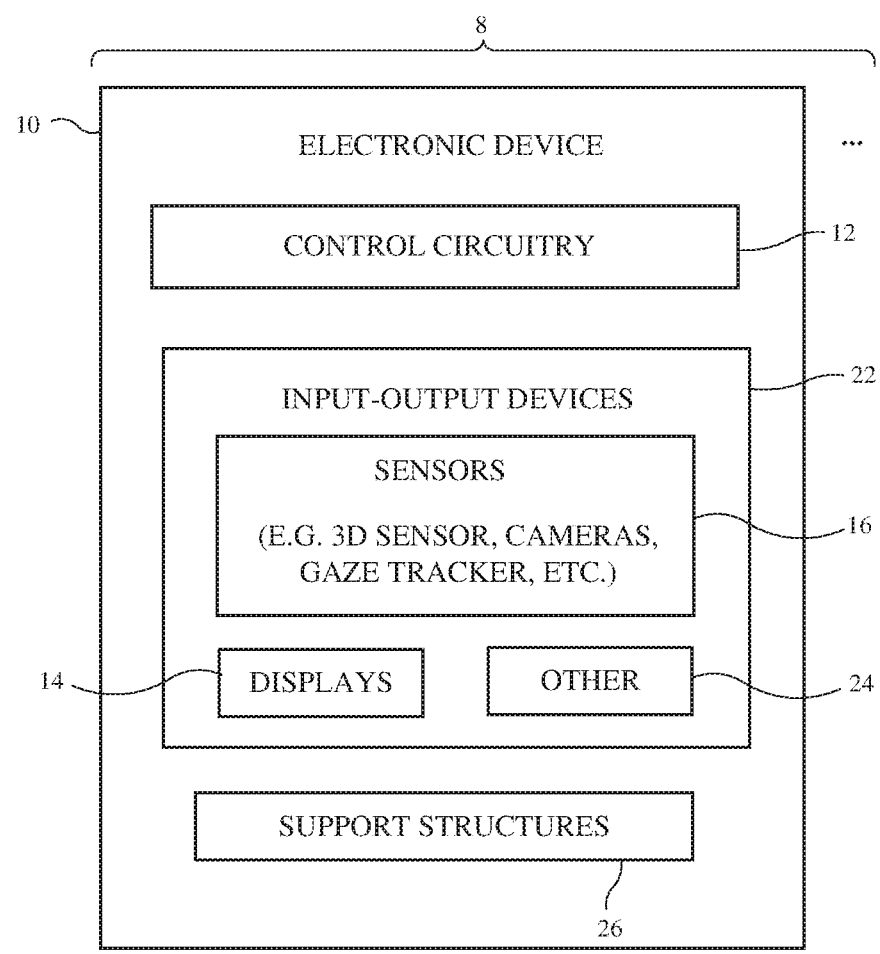
FIG. 1 is a schematic diagram of an illustrative electronic device such as a head-mounted display device in accordance with an embodiment.

A schematic diagram of an illustrative system in which user body measurements such as user facial feature measurements may be gathered using a three-dimensional sensor is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device may sometimes be described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations operations involved in processing three-dimensional facial image data, operations involving the adjustment of components using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit three-dimensional image data, the results of the analysis of three-dimensional image data, or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display(s) 14. Display(s) 14 may be used to display images. The images may be viewed by a user of device 10 and/or by others in the vicinity of the user. Display(s) 14 may be organic light-emitting diode displays or other displays based on arrays of light-emitting diodes, liquid crystal displays, liquid-crystal-on-silicon displays, projectors or displays based on projecting light beams on a surface directly or indirectly through specialized optics (e.g., digital micromirror devices), electrophoretic displays, plasma displays, electrowetting displays, or any other suitable displays.

Displays 14 may include one or more displays that present computer-generated content such as virtual reality content and mixed reality content to a user. Virtual reality content may be displayed in the absence of real-world content. Mixed reality content, which may sometimes be referred to as augmented reality content, may include computer-generated images that are overlaid on real-world images. The real-world images may be captured by a camera (e.g., a forward-facing camera) and merged with overlaid computer-generated content or an optical coupling system may be used to allow computer-generated content to be overlaid on top of real-world images. As an example, a pair of mixed reality glasses or other augmented reality head-mounted display may include a display device that provides images to a user through a beam splitter, prism, holographic coupler, or other optical coupler. Configurations in which a rear-facing display displays virtual reality content to a user through lenses may also be used.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based proximity sensors, other proximity sensors, strain gauges, gas sensors, pressure sensors, moisture sensors, magnetic sensors, audio sensors (microphones), ambient light sensors, microphones for gathering voice commands and other audio input, optical proximity sensors, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12.

Figure 2:
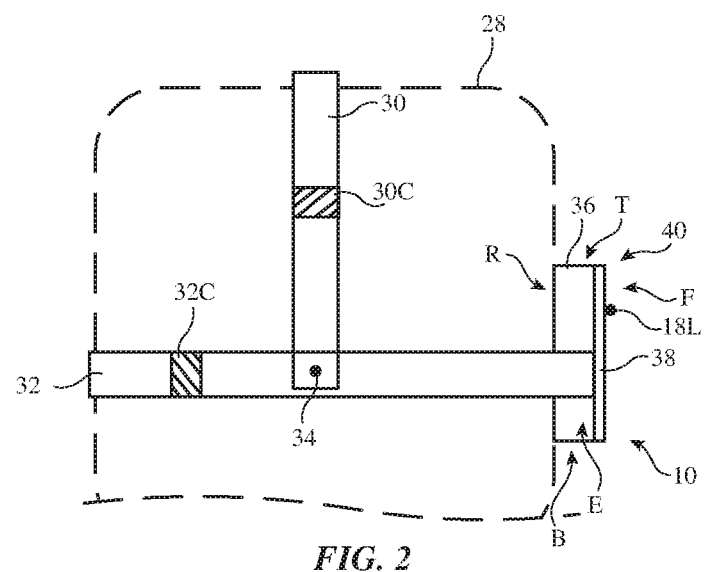
FIG. 2 is a side view of an illustrative head-mounted device being worn on a head of a user in accordance with an embodiment.

FIG. 2 is a side view of electronic device 10 in an illustrative configuration in which electronic device 10 is a head-mounted device. As shown in FIG. 2, electronic device 10 may include support structures (see. e.g., support structures 26 of FIG. 1) that are configured to mount device 10 onto user's head 28. These support structures may include, for example, head straps or other straps such as upper strap 30 and rear strap 32. Straps 30 and 32 may be coupled together by rotational joint 34. Straps 30 and 32 may, if desired, have sliding clasps or other movable mechanical couplings such as couplings 30C and 32C, respectively, that allow the lengths of straps 30 and 32 to be adjusted to fit a user's head.

Display(s) 14 may be mounted in a display housing such as main unit 40. Main unit 40, which may sometimes be referred to as the face unit, display unit, or main housing of device 10, may be coupled to strap 32. As shown in FIG. 2, face unit 40 may have surfaces such as front-facing (front) surface F and opposing rear-facing (rear) surface R, upper surface T, opposing lower surface B, and/or opposing left and right edge surfaces E. Displays 14 may be mounted on interior and/or exterior surfaces of device 10 such as upper surface T, bottom surface B, front-facing surface F, rear-facing surface R, interior portions of main unit 40 that face rearward towards user 28, and edge surfaces E. For example, a rear-facing display 14 may be used in displaying content for user 28 when device 10 is being worn on a user's head and when the user's eyes are located in eye boxes adjacent to rear-facing surface R. On surfaces such as surface F, E, T, and B, displays 14 may be used to display text, graphics, moving images, and/or other content for people in the vicinity of user 28 (e.g., members of the public may view publically-viewable display(s) mounted on these surfaces). Sensors 18 and displays 14 may also be mounted on one or more of these surfaces of unit 40 and/or on surfaces associated with straps 32 and 34. For example, one or more forward-facing cameras and/or one or more three-dimensional sensors may be mounted on front face F, as indicated by illustrative sensor location 18L of FIG. 2.

Main unit 40 may have an outer portion such as front-facing main unit portion 38 and an inner portion such as rear-facing main unit portion 36. Front-facing main unit portion 38 may be used in housing display(s) 14. Lenses, sensors, and other circuitry may also be housed in portion 38. If desired, heavier portions of device 10 (e.g., battery components, etc.) and/or other circuitry for device 10 may be mounted within the interior of straps 32 and/or 34 and/or may be coupled to an exterior portion of straps 32 and/or 34.

Portion 36 of main unit 40 may be a custom structure (e.g., a structure that is different for different users and that can accommodate the different types of facial features present on different users) and portion 38 may be a non-custom structure (e.g., a fixed structure that is identical for the different users who are receiving different custom versions of portion 36). Non-custom portion 38 may be, for example, identical for all devices 10 that are manufactured, whereas portion 36 may be provided in different versions (e.g., small, medium, and large versions, versions that accommodate narrowly spaced eyes, versions that accommodate widely spaced eyes, versions that accommodate users with eyeglasses, and/or other versions). Custom portion 36 may be, as an example, a removable insert (sometimes referred to as a custom user interface, custom face-fit structure, user module, face-fit module, detachable user-specific portion, etc.) that is customized to comfortably fit on the face of user 28. This approach allows portion 38 to have identical (or nearly identical) configurations for all users, while each individual user (or set of similarly situated users) may have a corresponding customized portion 36 that helps adapt main unit 40 to the specific shape of the user's body (e.g., the user's face).

With one illustrative arrangement, portion 36 may be customizable between a few different possible shapes (e.g., portion 36 may be provided in small, medium, and large sizes). With another illustrative arrangement, portion 36 may be available in a larger number of different configurations (e.g., at least 5 at least 10, at least 25, at least 50, fewer than 100, or other suitable number). Some of the custom configurations for portion 36 may accommodate users that wear glasses. Portion 36 may, in some arrangements, have individually adjustable sub-portions (e.g., a peripheral portion with multiple curves, a nose bridge portion, etc.). The sub-portions may be individually detachable and/or may form parts of an integral custom face-fit module). If desired, three-dimensional custom printing, custom molding (e.g., foam molding under heat and/or pressure), and/or other customization operations may be used in customizing portion 36.

The process of selecting a desired configuration for customized portion 36 may be facilitated by gathering three-dimensional information on a user's face. For example, a three-dimensional image may be captured using a three-dimensional sensor in device 10 (e.g., a forward-facing three-dimensional image sensor at location 18L on front face F of unit 40 as shown in FIG. 2) and/or using a three-dimensional image sensor in another (external) electronic device in system 8. Once a three-dimensional image of the user's face has been captured, control circuitry in system 8 can identify an appropriate custom shape for portion 36. The control circuitry that identifies an appropriate portion 36 for unit 40 to accommodate the user's face may be local control circuitry in device 10 such as control circuitry 12 and/or remote control circuitry such as circuitry 12 that is associated with a remote server, wristwatch device, external cellular telephone, tablet computer, laptop computer, or other external equipment. Information associated with the identified version of portion 36 that is to be coupled to unit 40 may be displayed visually (e.g., as text, graphics, etc.) on a display such as one of displays 14 on an exterior device surface (e.g., a front-facing surface F, edge surfaces E, upper surface T. or lower surface B).

After measuring the user's face and identifying an appropriate version of portion 36 to fit to the user's face, unit 40 may be customized. Customization operations may involve attaching an appropriate portion 36 to portion 38, fabricating custom parts, assembling custom and/or stock parts together to form unit 40, and/or performing other desired customization operations. Adjustments may also be made to the optical systems and/or other components in device 10. For example, the positions of lenses in unit 40 may be adjusted manually and/or with actuators to match the spacing of the lenses to the interpupillary distance of the user's eyes, to accommodate eye glasses being worn by the user, etc.

Figure 3:
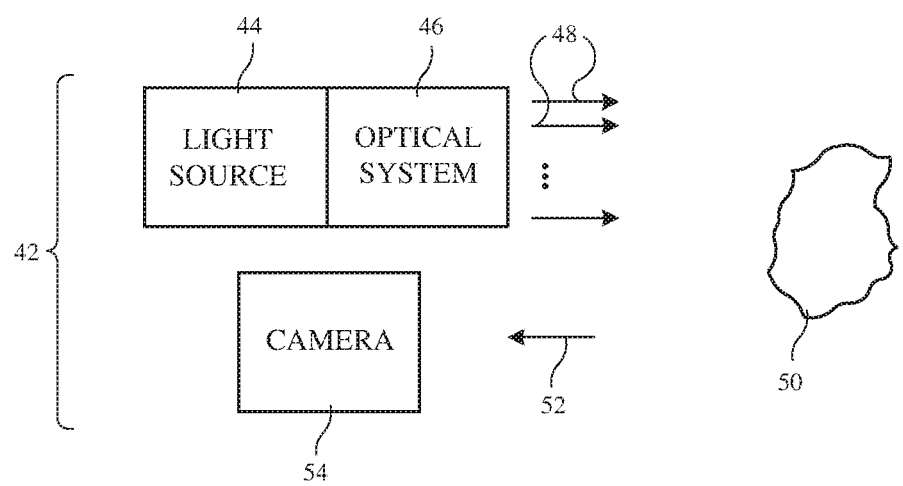
FIG. 3 is a diagram of a three-dimensional image sensor in accordance with an embodiment.

FIG. 3 is a diagram of an illustrative three-dimensional image sensor of the type that may be used to capture a three-dimensional image of a user's face. Light (e.g., infrared light and/or visible light) may be emitted by light source 44. Light source 44 may be, for example, a single laser, an array of vertical cavity surface emitting lasers or other laser diodes, one or more light-emitting diodes, or other source of light. During operation, light source 44 may emit one or more beams of light towards target object 50 (e.g., a user's head). Optical system 46 may split these beams of light into additional beams 48 (e.g., to increase the total number of light beams 48 that are emitted). The number of beams 48 that illuminates target object 50 may be, for example, at least 100, at least 500, at least 2000, at least 10,000, at least 25,000, at least 50,000, fewer than 1,000,000, fewer than 300,000, fewer than 100,000, or fewer than 75,000 (as examples). Camera 54 includes a digital image sensor that is sensitive to the wavelength of light associated with beams 48 (e.g., infrared light at 900-1000 nm, at least 700 nm, at least 800 nm, less than 2.5 microns, or other suitable wavelength). This allows camera 54 to capture infrared images (or visible images) of object 50 while object 50 is covered with an array of spots produced by the illumination of object 50 with beams 48, thereby producing three-dimensional maps (three-dimensional images) of target 50. The three-dimensional images may, for example, include a three-dimensional image of a user's face.

Figure 4:
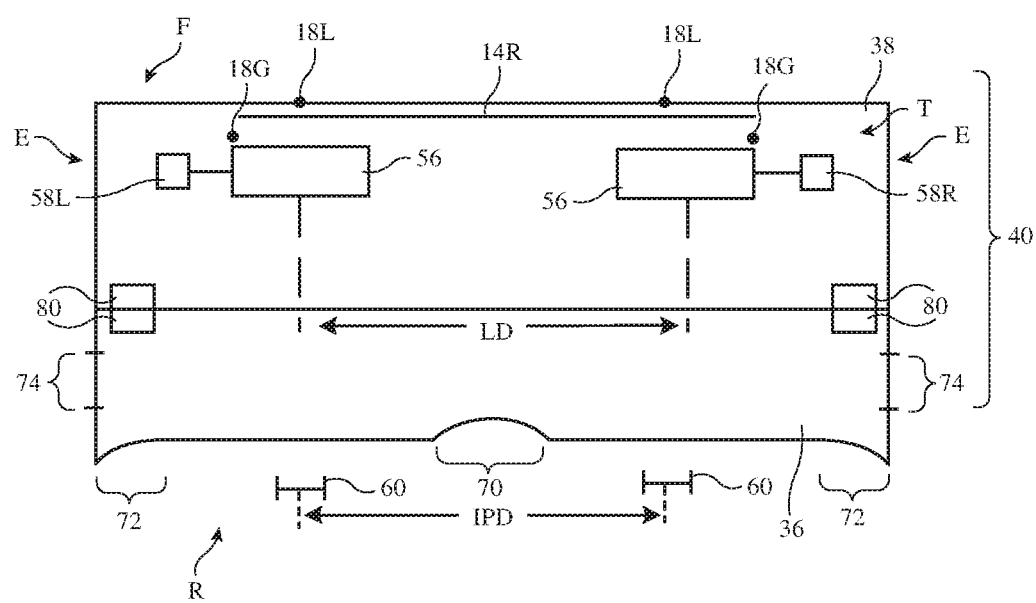
FIG. 4 is a top view of an illustrative head-mounted device having a removable face-fit module in accordance with an embodiment.
Figure 4:
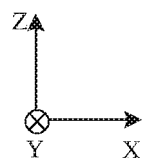

FIG. 4 is a top view of device 10 in an illustrative configuration in which device 10 includes a pair of lenses 56. Lenses 56 may include a left lens coupled to left actuator 58L and a right lens coupled to right actuator 58R. Actuators 58L may move lenses laterally (in the X-Y plane of FIG. 4) and/or may adjust the position of lenses 56 along the Z axis. The presence of lenses 56 allows a user with eyes located in eye boxes 60 to view images on rear-facing display 14R within unit 40. Display 14R may, for example, be mounted in portion 38 of unit 40 and may present images towards eye boxes 60.

An appropriate version of portion 36 to use in unit 40 may be identified using the three-dimensional image of a user's face. Portion 36 may, for example, be provided with a custom nose bridge portion 70 and custom curved side portions 72 that are configured to rest on the face of a user. Other attributes of portion 36 (or other structures in device 10) that may be customized include the overall size of unit 40 (e.g., portion 36), the weight of unit 40 (e.g., portion 36), whether portion 36 includes side holes such as openings 74 that allow a user to view the user's surroundings, the shape of unit 40 (e.g., whether portion 36 has side recesses and/or other structures to accommodate eye glasses on the user's head), the color and/or material used in forming unit 40 and portion 36, and/or other aspects of the shape, size, and appearance of unit 40.

If desired, facial data from a three-dimensional image captured with a three-dimensional sensor such as sensor 42 of FIG. 3 may be used to determine the distance between the eyes of the user (sometimes referred to as interpupillary distance IPD). Device 10 (e.g., control circuitry 12) can adjust the center-to-center spacing of lenses 56 accordingly. For example, left actuator 58L (e.g., a motor, etc.) and right actuator 58R may adjust lens-to-lens spacing LD until LD matches IPD. If desired, actuators 58L and 58R may be used to adjust the distance of lenses 56 from display 14R and/or from the users face along rear surface R. These adjustments of the position of lenses 56 with respect to the Z axis of FIG. 4 may help accommodate glasses and/or otherwise enhance the user's viewing comfort while viewing content on display 14R. Customizing adjustments to spacing LD may be made based on a three-dimensional image of the user's face (e.g., a three-dimensional face image captured while device 10 is not being worn on a user's head) and/or may be made based on real-time output from a gaze tracking system that are gathered while device 10 is being worn on the user's head. Rear-facing gaze trackers 18G may, for example, monitor the eyes of the user in eye boxes 60. In this way, gaze trackers 18G may determine interpupillary distance IPD. Control circuitry 12 may then adjust lens spacing LD accordingly in real time.

If desired, three-dimensional sensors such as sensor 42 of FIG. 3 may be located at forward-facing positions such as illustrative sensor locations 18L of FIG. 4. During normal operation of device 10, these forward-facing sensors may be used for functions such as object detection, plane recognition, etc. During set-up operations (e.g., when selecting a customized portion for unit 40 such as custom portion 36), a user may hold unit 40 in front of the user's face while device 10 is not being worn by the user so that three-dimensional sensor(s) at location(s) 18L face the user's face and capture a three-dimensional image of the user's face. Control circuitry 12 (and/or remote control circuitry on another device in system 8) can then inform the user of an appropriate selection for custom portion 36 (e.g., a size, or other part number identifying the custom version of portion 36 that is suited to the user).

Informative messages (e.g., messages identifying which version of portion 36 should be attached to portion 38 to customize unit 40 for the user) may be presented for the user on display 14R, a display 14 on front face F, edge surfaces E, upper surface T, lower surface B, and/or a display mounted in other portions of device 10. The informative messages may contain text, still images, moving images, etc. For example, if a user wears glasses and has a small face, a message may be displayed informing the user that the user should wear "size S for glasses" or informing the user that the user should obtain a version of portion 36 with model number ABC321. After obtaining the appropriate version of portion 36, that version of portion 36 may be coupled to portion 38 using coupling structures 80. Structures 80 may include magnets and other magnetic elements (e.g., iron bars), snaps, hooks, fasteners such as screws and other threaded fasteners, adhesive, hook-and-loop fasteners, and/or other engagement structures for attaching portion 36 to portion 38 and thereby forming unit 40. For example, structures 80 may include one or more magnetic structures in portion 38 and one or more corresponding magnetic structures in portion 36 that mate with the magnetic structures in portion 38 to hold portions 36 and 38 together.

Figure 5:
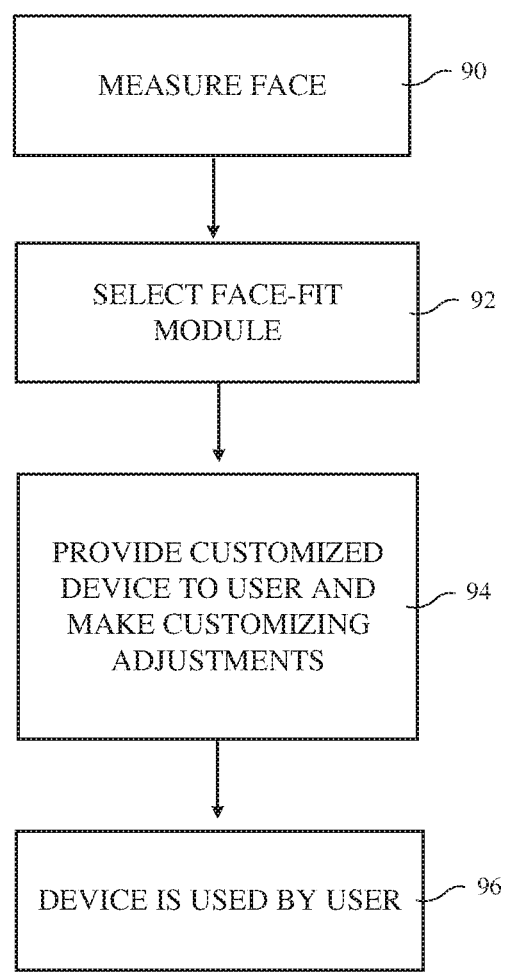
FIG. 5 is a flow chart of illustrative operations associated with using a head-mounted device in accordance with an embodiment.

A flow chart of illustrative operations involved in using system 8 is shown in FIG. 5.

During the operations of block 90, the portion of a user's body on which electronic device 10 is to be worn may be measured. The body part on which device 10 is to be worn may be, for example, the user's face. The user's facial features may be measured by using one or more sensors 18. As described in connection with FIG. 3, one illustrative technique for measuring the user's face involves capturing a three-dimensional image of the user's face with a three-dimensional sensor. The three-dimensional sensor may be a structured light sensor of the type shown in FIG. 3 or other suitable three-dimensional image sensor. If desired, three-dimensional images may also be captured by rotating the user's face relative to a single camera while capturing a series of images with the single camera.

The three-dimensional image sensor that is used in capturing the three-dimensional image of the user's face or other body part on which device 10 is to be worn may be located in device 10 (e.g., at a location such as one or more of locations 18L of FIG. 4 in which the three-dimensional sensor faces forwards away from rear-facing display 14R, at a location on other portions of unit 40, at a location on support structures such as straps 30 and 32, or elsewhere on support structures 26). If desired, the sensor that is used in capturing the three-dimensional image of the user's face may be located in external equipment in system 8. For example, a computer, cellular telephone, wristwatch, external head-mounted device, or other external electronic device (e.g., another electronic device in system 8 that is separate from the user's head-mounted device 10) may capture a three-dimensional image of the user's face.

The three-dimensional image of the user's face may be analyzed during the operations of block 92 to determine how to customize device 10 for the user. The three-dimensional image may be processed using control circuitry in the equipment that contains the three-dimensional image sensor or, using wired and/or wireless communications links in system 8, an image captured locally on device 10 and/or on external equipment may be transmitted to other suitable processing circuitry in system 8 for further analysis. For example, a remote server, a peer electronic device, device 10, and/or other external equipment in system 8 may be used in analyzing a three-dimensional image captured using the three-dimensional image sensor in device 10 or captured using a three-dimensional image sensor in another electronic device 10 in system 8. In arrangements in which images are captured and processed locally by device 10, control circuitry 12 in device 10 may use the three-dimensional image sensor in device 10 to capture the user's facial features in a three-dimensional image and may perform processing operations on the three-dimensional image to identify which version of custom portion 36 is to be used in device 10 for the user. These facial analysis operations may identify features of the user's face such as interpupillary distance and other distances between relevant facial features, nose shape, forehead shape, cheek shape, and/or other aspects of the shape of the user's face.

By analyzing the shape of the user's face, the control circuitry of system 8 can identify an appropriate custom version of electronic device 10 for the user. The control circuitry may, for example, identify a suitable face-fit module (e.g., portion 36 of unit 40) from a set of available prefabricated face-fit modules with different characteristics. The different face-fit modules may, for example, include face-fit modules suitable for faces of different size, facial features of different shapes, eyeglass wearers or non-eyeglass-wearers, etc. The control circuitry that identifies the appropriate face-fit module for the user during the operations of block 92 may be control circuitry 12 of device 10, may be control circuitry on external equipment such as a portable device or other device that has a three-dimensional image sensor that captured the three-dimensional image of the user's face, may be a server or other online computing equipment to which a three-dimensional image was transferred for processing such as a server associated with an online store that sells custom versions of electronic device 10, and/or may be other suitable control circuitry in system 8.

After identifying which version of custom portion 36 should be provided to a user, that version of portion 36 may be coupled to portion 38 to form a completed customized version of device 10 for the user. The customization process may involve manual and/or automated attachment of portion 36 to portion 38 (e.g., by the user or by personnel associated with a brick-and-mortar store or online store). Customization may also involve custom molding, custom three-dimensional printing, and/or other customization processes (e.g., processes that help adapt the shape of unit 40 and/or other portions of device 10 such as straps 30 and 32 to the user's face). In some arrangements, actuators such as actuators 58L and 58R of FIG. 4 (e.g., motors or other electromagnetic actuators such as linear solenoid actuators, piezoelectric actuators, and/or other actuators) may be used in adjusting device 10 based on the three-dimensional image of the user's face. For example, actuators 58L and 58R may automatically move lenses 56 to adjust the lens-to-lens spacing LD of lenses 56 to match the measured interpupillary distance IPD of the user.

Once device 10 has been customized by fitting a desired custom portion 36 into device 10, by adjusting lens positions and/or other adjustable components in device 10, and/or by otherwise customizing device 10, device 10 may be used by the user during the operations of block 96. In particular, a user may view content on display 14R, may listen to associated audio using speakers supported by support structures such as strap 32 and/or wirelessly coupled ear phones or other ear speakers, and/or may otherwise consume content being provided by device 10. During the operations of block 96, additional adjustments may be made to the components of device 10. For example, automatic adjustments to lens-to-lens spacing LD may be made based on real time measurements of the positions of the user's eyes (interpupillary distance IPD) that are gathered using gaze tracking system sensors 18G.

As described above, one aspect of the present technology is the gathering and use of three-dimensional images of a user's face and other data available from various sources to improve the use of system 8. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, facial information, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide facial data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
   a display that displays content for a user in a first direction;
   control circuitry;
   head-mounted support structures that support the display and the control circuitry; and
   a three-dimensional image sensor that is supported by the head-mounted support structures and faces a second direction that is the opposite of the first direction, wherein the three-dimensional image sensor is configured to capture a three-dimensional image of the user while the head-mounted support structure is not being worn by the user and wherein the control circuitry is configured to identify how to customize the electronic device for the user based on an analysis of the three-dimensional image.

2. The electronic device defined in claim 1, wherein identifying how to customize the electronic device for the user comprises identifying an appropriate size for a removable component in the electronic device.

3. The electronic device defined in claim 1, wherein identifying how to customize the electronic device for the user comprises identifying a part number for a removable component in the electronic device.

4. The electronic device defined in claim 1, wherein identifying how to customize the electronic device for the user comprises identifying a detachable peripheral portion for the head-mounted support structures.

5. The electronic device defined in claim 1, wherein identifying how to customize the electronic device for the user comprises identifying a detachable noise bridge portion for the head-mounted support structures.

6. The electronic device defined in claim 1, wherein identifying how to customize the electronic device for the user comprises identifying a removable module for eyeglass wearers.

7. The electronic device defined in claim 1, further comprising:
   lenses that are supported in the head-mounted support structures through which the display is viewable; and
   actuators coupled to the lenses, wherein the control circuitry uses the actuators to adjust the lenses based on the three-dimensional image of the user.

8. An electronic device, comprising:
   a display that displays content for a user in a first direction;
   control circuitry;
   a head-mounted support structure that supports the display and the control circuitry;
   a three-dimensional image sensor that is supported by the head-mounted support structure and faces a second direction that is the opposite of the first direction, wherein the three-dimensional image sensor is configured to capture a three-dimensional image of the user while the head-mounted support structure is not being worn by the user;
   lenses through which the display is viewable, wherein the lenses are supported by the head-mounted support structure; and
   actuators coupled to the lenses, wherein the control circuitry uses the actuators to adjust the lenses based on the three-dimensional image of the user.

9. The electronic device defined in claim 8, wherein the control circuitry is configured to analyze the three-dimensional image to measure an interpupillary distance of the user.

10. The electronic device defined in claim 9, wherein the control circuitry is configured to use the actuators to adjust the lenses based on the interpupillary distance.

11. The electronic device defined in claim 8, further comprising:
    a strap coupled to the head-mounted support structure.

12. A system, comprising:
    a head-mounted structure having a rear-facing display that displays content for a user and having a removable component;
    a front-facing three-dimensional image sensor that captures a three-dimensional image of a face of the user; and
    control circuitry configured to analyze the three-dimensional image to identify a version of the removable component to couple to the head-mounted structure from among multiple versions of the removable component, wherein the front-facing three-dimensional image sensor is coupled to the head-mounted structure and captures the three-dimensional image of the face of the user while the head-mounted structure is not being worn by the user.

13. The system defined in claim 12, wherein the control circuitry is configured to inform the user of an appropriate size for the removable component.

14. The system defined in claim 12, wherein the control circuitry is configured to inform the user of a part number of the version of the removable component that is suited to the user.

15. The system defined in claim 12, wherein the removable component comprises a nose bridge portion for the head-mounted structure.

16. The system defined in claim 12, wherein the head-mounted structure comprises a main unit, the system further comprising:
   magnetic structures configured to removably couple the removable component to the main unit.

17. The system defined in claim 12, wherein the head-mounted structure comprises a main unit, the system further comprising:
   a first magnetic structure in the main unit; and
   a second magnetic structure in the removable component that is configured to mate with first magnetic structure.

* * * * *